United States Patent

[11] 3,622,392

[72] Inventors Duane M. Larsen; Mark J. Terlecke, both of Madison, Wis.

[21] Appl. No. 772,774
[22] Filed Nov. 1, 1968
[45] Patented Nov. 23, 1971
[73] Assignee ESB Incorporated

[54] ORGANIC DEPOLARIZED CELL CONSTRUCTION
7 Claims, 3 Drawing Figs.

[52] U.S. Cl. .......... 136/30, 136/133, 136/107, 136/177, 136/137
[51] Int. Cl. .......... H01m 43/02
[50] Field of Search .......... 136/30, 102, 137, 107, 6, 133, 177–179

[56] References Cited

UNITED STATES PATENTS

| | | | |
|---|---|---|---|
| 2,592,439 | 4/1952 | Lee | 136/169.1 |
| 3,115,428 | 12/1963 | Urry | 136/107 |
| 2,773,926 | 12/1956 | Glover | 136/107 |
| 2,876,272 | 3/1959 | Bence et al. | 136/107 |
| 3,184,341 | 5/1965 | Reilly | 136/107 |
| 3,214,298 | 10/1965 | Urry | 136/107 |
| 3,278,339 | 10/1966 | Reilly et al. | 136/107 |
| 3,338,750 | 8/1967 | Urry | 136/107 |
| 3,357,865 | 12/1967 | Davis et al. | 136/137 |
| 3,376,166 | 4/1968 | Hruden | 136/107 |
| 3,420,714 | 1/1969 | Knight | 136/107 |

*Primary Examiner*—Winston A. Douglas
*Assistant Examiner*—C. F. Lefevour
*Attorneys*—Alfred J. Synder, Jr., Robert H. Robinson, Raymond L. Balfour and Joseph M. Corr

ABSTRACT: A cell having an outward appearance similar to a conventional primary LeClanche cell but having certain internal structural features that render the cell rechargeable, including an organic depolarizer, insulating means about the portion of the carbon rod located in the cell airspace, laminated separator means about substantially the entire inner wall of the negative electrode can, laminated insulating means along the interior bottom of the negative electrode can, and a vent washer located on top of the cell sealant enabling gases formed in the cell interior to escape to the atmosphere. A one-piece plastic closure has also been developed which eliminates the need for the cell sealant and serves as an insulator about the portion of the carbon rod locatd in the airspace as well as incorporating means to vent gases from the cell, thereby eliminating the separate vent washer.

20 28 41 40 33 42 22 32 39 31 36 38 24 26 34 25 37 22 27 21 23 29 30 35

ORGANIC DEPOLARIZED CELL CONSTRUCTION

BACKGROUND OF THE INVENTION

Many attempts have been made over the years to improve the physical characteristics and the lifespan of the normal LeClanche cell. Such a cell comes in a multitude of sizes and shapes, and is used as a power source in a variety of articles such as flashlights and transistor radios. This type of cell is oftentimes referred to as a "primary" or dry cell and cannot be efficiently recharged due to the chemical characteristics of the inorganic depolarizer mix, usually manganese dioxide, used in such cells and oftentimes termed the cathode or cathode mix.

Structure modifications as well as changes in the cell elements have been made in the past to better the performance of LeClanche cells. However, these dry cells are still limited in operation by their inability to be recharged efficiently. Also, the conventional construction does not allow for venting of gases from the cell. Thus, a rechargeable cell must be so constructed as to be able to vent gases formed in the cell when it is being charged. The invention disclosed herein relates to the construction of a rechargeable cell that has some of the basic features of a LeClanche dry cell and can be a suitable substitute for that cell in certain instances.

SUMMARY OF THE INVENTION

The overall purpose of this invention therefore is to have an improved cell that can be efficiently cycled numerous times. For practical and commercial reasons it is an object of the invention to provide a rechargeable cell having the same outer physical dimensions as the conventional primary cell. One of the basic elements that enables this cell to be recharged in an organic depolarizer that is used in place of the inorganic depolarizer in use today. The basic purpose of having a rechargeable cell is also achieved in part by the fact that the improved construction allows for venting of the gases formed during charge.

It is a further object therefore, of this invention to incorporate means in the cell construction which prevent the cell terminal cap from becoming embedded in the cell sealant. In addition, it is an object of the invention to have a means of providing a venting path between the crimped top edge of the metal outer jacket and the rolled outer edge of the terminal cap over which the top edge of the metal jacket is crimped. With the use of these means the object of providing a cell construction which permits venting of the cell is achieved.

Another object of this invention is to have a cell with a depolarizer mix containing an azodicarbonamide compound and to provide insulating means which must be incorporated into the cell to permit cycling over extending periods of time. By using the improved cell construction of this invention, the basic purpose of having a rechargeable cell is achieved in part by the fact that zinc dendritic growths which appear in the cell after cycling are prevented from contacting the positive electrode and causing a short circuit. In the construction of this invention, it is an object to place an improved separator material along substantially the entire vertical walls of the zinc can. This improved separator is a laminated construction and greatly resists penetration by zinc dendrite growths thereby lessening to a great extent the occurrence of a short circuit between the depolarizer mix or carbon rod, which together form the positive electrode, and the zinc can. Also, the bottom of the zinc can is insulated from the depolarizer mix by a laminated insulator.

By insulating the internal cell system at certain locations the goal of minimizing the modifications to the present process of manufacturing a conventional dry cell is achieved so that the aim of producing a rechargeable cell economically is attained.

It is an additional object of the invention to provide a one piece plastic closure preferably made of polyethylene and constructed so as to perform several functions in a cell, which functions are conventionally performed by separate elements of the cell.

It is also an object of this invention to construct a rechargeable cell having a one piece plastic closure which serves as an insulator, a sealant and a vent.

The cell construction which is the subject of this invention basically comprises a zinc can electrode, a laminated separator which lines substantially the entire vertical walls of the zinc can, a porous carbon rod in the center of the zinc can, insulation about the carbon rod in the area known as the airspace of the cell, an azodicarbonamide depolarizer mix, laminated insulation at the bottom of the zinc can, a sealant, and a vent washer on top of the sealant to allow the venting of gases during storage and operation. In an alternative construction, the sealant, vent washer and insulation about the carbon rod in the cell airspace are combined in a one-piece polyethylene closure which performs the three functions normally serves by the three named parts. Employment of this type of cell construction has resulted in providing a cell which is similar in some respects to the conventional LeClanche primary cell in use today but which has the significant property of being rechargeable.

DESCRIPTION OF THE PREFERRED EMBODIMENT

Figures 1, 2, 3:
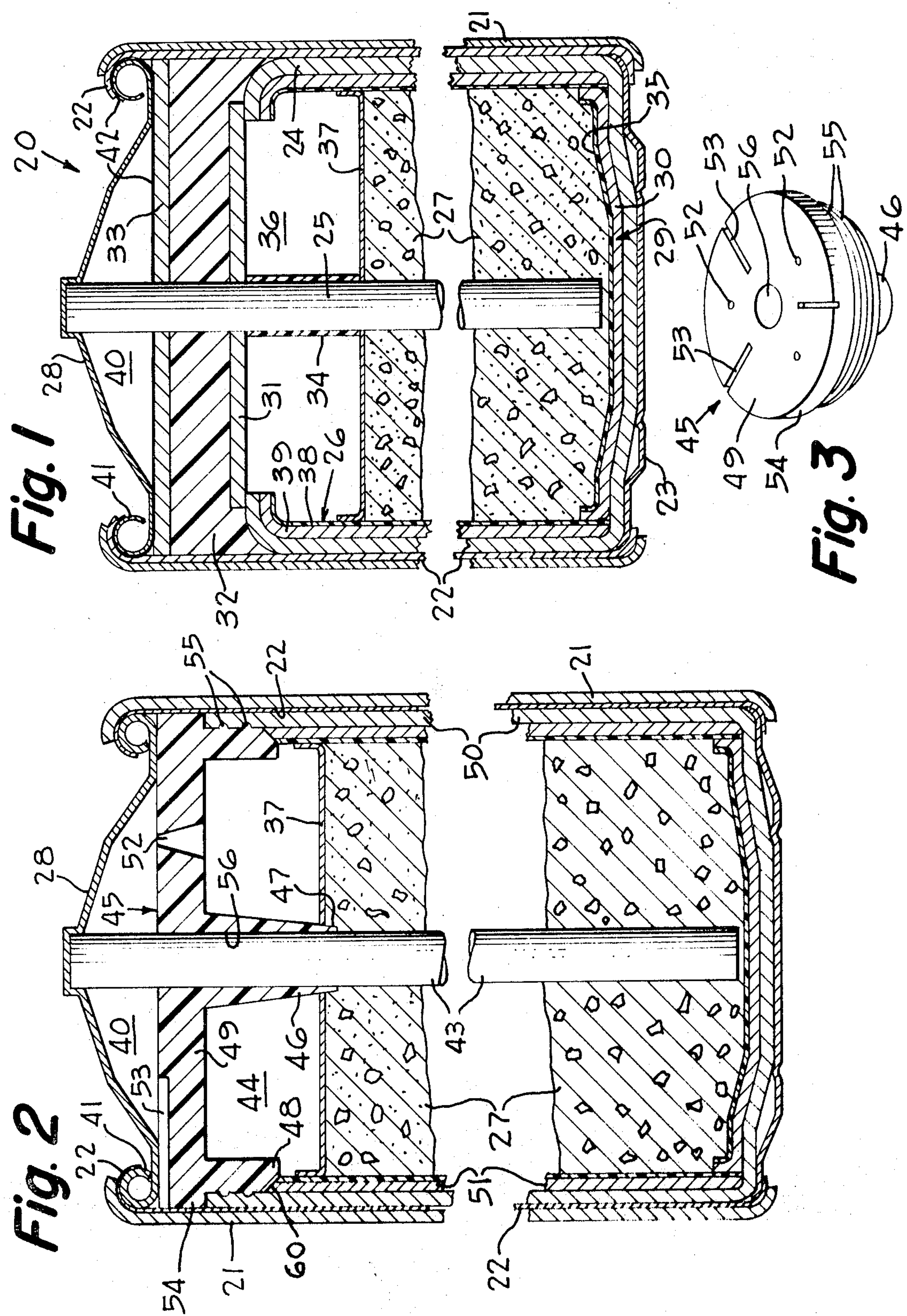
FIG. 1 is an elevational and partially diagrammatic view in section of a cell of this invention.
FIG. 2 is an elevational and partially diagrammatic view of an alternate construction having a one-piece plastic closure in place of several elements appearing in FIG. 1.
FIG. 3 is a perspective view of the one-piece plastic closure used in the alternate construction of FIG. 2.

Referring to FIG. 1 we see a detailed elevational and partially diagrammatic drawing in section of a cell of this invention. The cell is generally designated as 20 with an outer metal jacket denoted by 21. This outer jacket is lined in the interior by an insulator 22. The jacket 21 and the insulating liner 22 are shown folded over at the base of the cell thereby retaining a metal disk 23 clamped against the negative electrode can 24 which usually is made of zinc. The metal disk 23 serves as a contact point for the negative electrode to the outside circuit. A metal cap 28 is shown at the top of the cell insulated from the metal jacket 21 by the insulator 22 and serves as the contact point for a porous carbon rod 25 shown centrally located in the cell. A separator 26 lines the inner wall of the negative can 24 and separates the can from the organic depolarizer mix 27 which surrounds the porous carbon rod 25 and fills the annular area between the rod and the separator 26 up to a top-insulating material located at 37 on top of the depolarizer mix. The insulator 37 is preferably paraffined kraft paper although a laminated construction of paper and nonconductive plastic could be used. This insulator aids in preventing dendritic growths developing from the top of the depolarizer mix 27 to the zinc can.

The carbon rod 25 and the depolarizer mix 27 are insulated at the bottom of the cell from the negative electrode can 24 by a bottom-insulating cup 29, which preferably is a lamination of paraffined kraft paper 30 and any nonconductive, inert plastic material 35 such as polyethylene. This insulator also prevents dendrite growths from the zinc can to contact the depolarizer mix or the carbon rod. Instead of the laminated construction of the insulator 29, a disk of plastic material could be used or a coating of plastic could be allowed to solidify on the bottom of the can 24.

Resting on the crimped top edge of the negative can 24 and covering the open end of the can is an insulating element 31 referred to as a seal washer which can be made of a strong kraft paper. A sealing compound 32 seals the interior of the cell and is supported by the crimped edge of the negative can and the washer 31 so that a maximum airspace 36 is provided. Between this sealing compound and the metal terminal cap 28 is an insulator 33 called a cap washer which serves to prevent the metal cap 28 from becoming embedded in the sealant 32 when the cap is forced downward under the crimped edges of the casing 21 and the insulating liner 22. If the cap were allowed to become embedded in the sealant, the area 40 would be effectively sealed so that gases formed in the cell could not be vented as described below and a dangerous pressure would thereby be able to build up in the cell.

Although the cap washer 33 prevents the cap 28 from becoming embedded in the sealant 32, there remains another possibility that the area 40 could be sealed and thereby prevent the cell from being vented. When the cap 28 is forced down onto the washer 33 and sealant 32, some of the sealant can be, and often is, forced up along the paper insulator 22 and acts as a seal between the insulator and the rolled edge 41 of the cap. As a result the area 40 is sealed and the cell cannot be vented.

Therefore, there is provided on top of the cap washer 33 a second, thin vent washer 42. This washer is larger in diameter than the inner diameter of the cell 20 and its edge extends up around and thereby lines the rolled edge 41 of the cap 28. The washer is thin in order to be capable of being folded over the edge 41 and also must be tough enough so that the sealant 32 cannot break through it and seal the area between the edge 41 of the cap and the insulator 22. The vent washer therefore performs the extremely useful and important function of being a vent path for gases to escape to the atmosphere. A material that has been successfully used for this washer 42 is a 5-mils-thick laminated construction of kraft paper-polyethylene-kraft paper. A thin layer of paraffined kraft paper, or wax paper or cellophane or other plastic would also be suitable for use in this washer. Also, with the proper choice of material and thickness, it is contemplated that one thin washer can be used in place of the two separate washers 33 and 42.

Venting of gases from the cell results from the gases entering the porous carbon rod 25 and collecting in the area 40 under the cap 28 and the escaping from beneath the cap in the vicinity where the casing 21 and insulating liner 22 are crimped over the rolled edge 41 of the cap 28. As mentioned above the vent path around the rolled edge 41 is provided by the vent washer 42. The carbon rod is constructed to have a controlled porosity to permit gases to flow up the rod for venting purposes and still prevent electrolyte from entering and wetting the rod and corroding the cap 28. Surrounding the carbon rod 25 in the air space 36 is another insulator 34. With the use of this particular cell construction and an organic depolarizer mix the basic purposes of this invention are achieved.

The insulator 34 which surrounds the carbon rod in the air space 36 is impermeable to electrolyte and together with the separator 26 restricts the growth of zinc dendrite from the zinc can to the carbon rod and thereby aids in preventing a short circuit between the zinc can and the carbon rod. A suitable material to be used as this insulator 34 has been found to be polyethylene. The separator 26 lines the entire inner wall of the zinc can including the portion in the airspace 36 and is not folded over the top of the depolarizer mix as in the conventional cell. A preferred separator material comprises using a semipermeable barrier material in combination with an absorbent material, such as a thermoplastic resin which serves as a continuous elastomeric binder matrix for a gelling agent such as a starch-wheat flour mixture, carboxymethyl cellulose, etc. In particular, a separator used successfully in a cell of this invention consists of a laminated construction of a layer of cellophane with a layer of an ethylene/vinyl acetate copolymer, such as Elvax, having therein a gelling agent such as starch-wheat flour mixture. The cellophane layer 38, being the semipermeable barrier, is in contact with the depolarizer mix while the Elvax layer 39 is placed against the zinc can. Another laminated separator which has been used consists of a layer of victory paper on a layer of cellophane with the cellophane again in contact with the depolarizer mix while the paper lines the zinc can. To have the carbon rod and zinc can insulated from each other in the airspace 36 in such a way as to prevent a short circuit between these two elements greatly aids in enabling the cell to be recharged numerous times. The laminated separator also prevents zinc dendrite growths from growing from the side walls of the zinc can to the depolarizer after numerous cycling.

In FIG. 2 there is shown an alternate construction of a rechargeable cell of this invention. The distinguishing feature between the construction shown in FIG. 1 and that shown in FIG. 2 is the one-piece plastic closure 45 shown in FIG. 2 under the cap 28. Similar reference characters have been used to designate components similar to those shown in FIG. 1. The carbon rod 43 is shown passing through the center of the closure and is surrounded in the airspace 44 by a tubular projection 46 of the plastic closure. The projection 46 is embedded at one end 47 in the depolarizer mix 27 to prevent an electrolyte path to be present at the point where the carbon rod passes through the insulator 37. The plastic closure 45 is pressed down inside the insulator lining 22 and the rim 54 of the closure rests on the top edge of the zinc can 50 while sidewalls 48 are pressed against the zinc can. The sidewalls 48 preferably have ribs 55 around the outside so as to permit a positive gripping action to take place between the zinc can and the plastic closure. The closure is snapped into place to provide a good mechanical seal between the zinc can and the closure. The bottom edge 60 of the sidewalls 48 is beveled so as to retain the laminated separator 51 against the zinc can in the airspace 44.

As can be seen in FIG. 2 no vent washer or sealant is provided since the plastic closure serves the function of these two elements in addition to insulating the carbon rod in the airspace 36 as discussed above. The top 49 of the closure incorporates means for venting the gases as well as replacing the sealant 32 shown in FIG. 1. Venting is accomplished through holes and grooves in the top 49 with one of the holes 52 and one of the grooves 53 being shown in FIG. 2. Gas passes from the interior of the cell up through hole 52 into the space 40 under the cap 28 and flows in the channel formed by groove 53 out to the edge of the rim 54 of the top 49. The gas then escapes to the atmosphere in the area where the rolled edge 41 of the cap is crimped under the casing 21.

A better understanding of the features of the one piece plastic closure can be obtained by looking at FIG. 3 where a perspective view of it is shown. The closure has a flat circular top 49 with an opening 56 in the center and corresponding tubular projection 46 depending from the top. Several ventholes 52 are provided in the top, together with several grooves 53 which are cut into the upper surface of the top 49. These grooves extend to the edge of the top and act as channels, permitting gas which passes through the vent holes from the cell interior to reach the outer edge of the plastic closure. Referring briefly to FIG. 2, the metal cap 28 is shown pressed against the closure 45 at the outer edges where the cell casing 21 is crimped over the rolled edge 41 of the cap. With the amount of pressure exerted by the crimping force, it would be possible to press the cap down onto the closure so that a seal could effectively exist around the area of the rim 54 of the closure. If there were such a seal then gases entering the space 40 under the cap would not be able to escape and the cell would not be vented. However, by cutting out grooves, as shown at 53 in FIG. 3, the formation of such a seal is prevented and gases are able to escape as described above.

Referring to FIG. 3 again the grooves 53 are shown offset from the vent holes 52. This is preferably done to deter any electrolyte which might in some way pass up through the venthole and reach the top 49 of the closure from getting into the groove and leaking out beneath the cap 28. By offsetting the grooves 53 from the holes 52, therefore, a vent path for gases is provided while a direct leakage path for any stray electrolyte present on the top 49 of the plastic member is not afforded. Although this is the preferred arrangement of the holes and grooves, it is clearly recognized that the number and arrangement of the holes and grooves could be varied and not be restricted to the illustrated scheme. In fact each hole could actually communicate directly with each groove to accomplish venting of the cell. Also there could be just one hole and one groove although a plurality of each is desirable. Also it is possible to put holes in the tubular projection 46 so that gases could flow up inside the tubular projection to the top 49 and then escape around the edge 41 of the cap.

Polyethylene is the preferred material to be used in this one-piece plastic closure, although other plastics can be used. The closure is shown as being circular which is the shape needed for use in cylindrically shaped cells such as those used in flashlights and similar instruments. If other means for venting the cell are used then the vent holes and grooves can be eliminated so that the closure serves the dual function of being a sealant and an insulator. Of course it is contemplated to modify this unitary plastic closure and use it in cells of different shapes and not limit it to use in cylindrically shaped cells.

The depolarizer mix used in the cell of this invention contains a substituted or an unsubstituted azodicarbonamide compound of the type disclosed in U.S. Pat. No. 3,357,865 issued on Dec. 12, 1967 to Stanley M. Davis, Charlotte M. Kraebel and Richard A. Parent and which is present in the depolarizer mix in an amount ranging from about 5 to about 60 percent by weight of the total mix. These compounds may be generally represented by the formula:

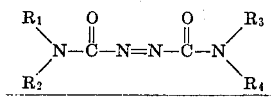

where $R_1$, $R_2$, $R_3$ and $R_4$ may be hydrogen, alkyl of 1 to 8 carbon atoms, mono- and dicarbocyclic aryl or substituted aryl, cyclo-alkyl, aralkyl, alkoxyalkyl, cyanoalkyl, haloalkyl, nitroalkyl, alkenyl, and where $R_1$ and $R_2$ and/or $R_3$ and $R_4$, when alkyl, may be joined together through a nitrogen, sulfur or oxygen linkage to form a heterocyclic ring.

The preferred azodicarbonamide compounds are those in which the nitrogen atoms carry an alkyl radical of 1 to 4 carbon atoms. In particular, a di-N-butyl azodicarbonamide compound has been successfully used in the depolarizer mix in amounts ranging between 15 to 3 percent by weight of the depolarizer mix. As disclosed in U.S. Pat. No. 3,357,865, it is possible to use the corresponding substituted or unsubstituted biurea and oxidize it by charging the cell in the presence of an appropriate catalyst, thereby forming an azodicarbonamide compound in situ in the cell. Furthermore, mixtures of the azodicarbonamide compounds may be used in the depolarizer mix as well as the compounds individually. The depolarizer mix also contains electrolyte solution and conductive carbon, such as graphite, acetylene black or other high surface area carbon blacks. A mercury salt additive is also mixed with the azodicarbonamide to improve the cycle life and storage life as well as to increase the stability of the azodicarbonamide compound.

The electrolyte used generally comprises an aqueous solution containing a soluble salt, such as halide salts or mixtures thereof. It is preferred to use a conventional LeClanche electrolyte which comprises an aqueous solution of ammonium chloride and zinc chloride.

Our invention which has been described herein has been successful in providing a rechargeable cell which can readily and advantageously replace the conventional LeClanche cell in certain market areas. The scope of the invention is not to be considered limited to any particular shape of cell and the adaptability of its novel features to electric cells will be readily recognized by those skilled in the art.

What we claim is:

1. A cylindrical, rechargeable cell comprising, in combination, a negative electrode can open at one end and having the top edge crimped over to form a shoulder, a bottom insulator in the bottom of said can, a laminated separator lining substantially the entire inner vertical walls of said can, a positive electrode comprising an azodicarbonamide depolarizer mix disposed within said can and a current collector centrally imbedded in said depolarizer mix, a metal cap on top of said current collector to serve as a terminal therefor and having its outer edge rolled over, a top insulator resting on top of said depolarizer mix and located below the top of said can, a sealant to seal said cell under said metal cap, a seal washer located a distance above said depolarizer mix and across the open end of said can on the shoulder formed by the crimped edge of said can and supporting said sealant which is sealed to the outer surface of said can, a plastic insulating means surrounding and in contact with said current collector throughout the airspace formed above said top insulator and below said seal washer, an outer metallic jacket housing said cell which is separated from said negative electrode can by an insulator and which has its top edge crimped over the rolled outer edge of said cap, a vent washer above said sealant, said vent washer having a larger diameter than the inner diameter of said cell, said vent washer being interposed between said rolled edge of said cap and said crimped edge of said metallic jacket and extending beyond the edge of said metallic jacket into contact with the atmosphere surrounding the cell, whereby said vent washer serves as a vent path for gases which collect under said cap.

2. A cell of claim 1 wherein said azodicarbonamide depolarizer is represented by the formula:

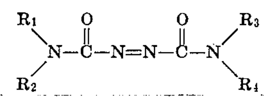

wherein $R_1$, $R_2$, $R_3$ and $R_4$ are each hydrogen or alkyl radical of 1 to 4 carbon atoms.

3. A cell in accordance with claim 1 in which there is a cap washer between said vent washer and said sealant.

4. A cell in accordance with claim 1 in which the negative electrode can is zinc and there is an insulator between said zinc can and said outer metallic jacket.

5. A cell in accordance with claim 1 in which said laminated separator comprises a first layer of an absorbent material in contact with said can and a second layer of a semipermeable barrier material in contact with said depolarizer mix.

6. A cell in accordance with claim 5 in which the barrier material is cellophane and the absorbent material is a gelling agent dispersed in a thermoplastic resin binder matrix.

7. A cell in accordance with claim 6 in which the thermoplastic resin binder is an ethylene/vinyl acetate copolymer and the gelling agent is a starch/flour composition.

* * * * *